(12) United States Patent  (10) Patent No.: US 8,468,569 B2
Osaki et al.  (45) Date of Patent: Jun. 18, 2013

(54) CONTENT DELIVERY SYSTEM AND METHOD, AND SERVER APPARATUS AND RECEIVING APPARATUS USED IN THIS CONTENT DELIVERY SYSTEM

(75) Inventors: Yoshiro Osaki, Kawasaki (JP); Kiyoshi Yamaguchi, Hino (JP); Shinichi Kurihara, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 690 days.

(21) Appl. No.: 12/041,135

(22) Filed: Mar. 3, 2008

(65) Prior Publication Data

US 2008/0235742 A1    Sep. 25, 2008

(30) Foreign Application Priority Data

Mar. 20, 2007  (JP) .................................. 2007-072366

(51) Int. Cl.
*H04N 7/173*  (2011.01)
(52) U.S. Cl.
USPC .............................................. 725/88; 725/91
(58) Field of Classification Search
None
See application file for complete search history.

(56) References Cited

U.S. PATENT DOCUMENTS

| | | | | |
|---|---|---|---|---|
| 5,720,037 A * | 2/1998 | Biliris et al. | | 725/92 |
| 5,732,217 A * | 3/1998 | Emura | | 725/90 |
| 2003/0123853 A1 | 7/2003 | Iwahara et al. | | 386/69 |
| 2003/0229894 A1* | 12/2003 | Okada et al. | | 725/41 |
| 2004/0093618 A1* | 5/2004 | Baldwin et al. | | 725/101 |
| 2004/0230994 A1 | 11/2004 | Urdang et al. | | |
| 2005/0097614 A1 | 5/2005 | Pedlow, Jr. et al. | | |
| 2005/0141853 A1* | 6/2005 | Takemura | | 386/46 |
| 2005/0191031 A1* | 9/2005 | Lee | | 386/68 |
| 2007/0009231 A1* | 1/2007 | Shinkai et al. | | 386/95 |
| 2007/0150925 A1* | 6/2007 | Fujishiro | | 725/93 |
| 2007/0252732 A1* | 11/2007 | Kitaguchi et al. | | 341/50 |
| 2008/0114890 A1 | 5/2008 | Kurihara et al. | | |

FOREIGN PATENT DOCUMENTS

| | | |
|---|---|---|
| EP | 0 812 112 A3 | 1/2002 |
| EP | 1 534 013 A1 | 5/2005 |
| JP | 8-154230 | 6/1996 |
| JP | 8-336111 | 12/1996 |
| JP | 2002-27384 | 1/2002 |
| JP | 2006-304272 | 11/2006 |
| WO | WO 03/094499 A3 | 11/2003 |
| WO | WO 2004/102571 A1 | 11/2004 |
| WO | WO 2006/094131 A2 | 9/2006 |
| WO | WO 2006/109381 A1 | 10/2006 |

OTHER PUBLICATIONS

Osaki, "Broadcast System, and its distribution device and terminal device", U.S. Appl. No. 11/892,679, filed Aug. 27, 2007.
Notice of Reasons for Rejection mailed Jan. 6, 2009, issued by the Japanese Patent Office in JPO Patent Application No. 2007-072366.
Combined Search and Examination Report issued by the United Kingdom Intellectual Property Office on Jul. 1, 2008, for GB0804036.2.
Kimiyama, U.S. Appl. No. 12/049,081, filed Mar. 14, 2008, entitled IP Broadcast System, and Multiplexer, Receiving Apparatus and Method Used in IP Broadcast System.

* cited by examiner

*Primary Examiner* — Cai Chen
(74) *Attorney, Agent, or Firm* — Finnegan, Henderson, Farabow, Garrett & Dunner, LLP

(57) ABSTRACT

A server apparatus includes a memory which stores a management table relating content identification information for specifying the content and a trick play request and a trick play data, and a transmitter which refers to the management table based on the content identification information and the trick play request, reads out the corresponding trick play data from the management table according to the reference result, to transmit the trick play data to the receiving apparatus from the specified reproduction starting position.

19 Claims, 5 Drawing Sheets

CONTENT DELIVERY SYSTEM AND METHOD, AND SERVER APPARATUS AND RECEIVING APPARATUS USED IN THIS CONTENT DELIVERY SYSTEM

CROSS-REFERENCE TO RELATED APPLICATIONS

This application is based upon and claims the benefit of priority from prior Japanese Patent Application No. 2007-072366, filed Mar. 20, 2007, the entire contents of which are incorporated herein by reference.

BACKGROUND OF THE INVENTION

1. Field of the Invention

The present invention relates to a content delivery system which provides a Video On Demand (VOD) service from a content delivery server to a user on a receiver side using the Internet Protocol (IP) network and a VOD service providing method, and a server apparatus which provides this VOD service and a receiving apparatus having a function of receiving the VOC service.

2. Description of the Related Art

With the advent of a high speed and high performance communication network, "broadcast" and "communication" are getting united more and more and a demand for the VOD which delivers high definition video through the IP communication is expected. This VOD is a service of delivering video and music contents through the IP network (for example, refer to Jpn. Pat. Appln. KOKAI Publication No. 2006-304272) in which a user enjoys various kinds of contents such as video and music at home with his or her own video display, instead of going out to a movie theater or a rental video shop.

The market of the VOD which delivers the high definition video is expected to be more and more active and it becomes necessary for a service provider to find contents that are more attractive in order to get more customers. Further, it naturally requires a function of trick play like the currently prevalent video/Digital Versatile Disk (DVD)/Hard Disk (HD) players. When the delivery speed of the VOD delivery server is changed, there arises such a problem that the line occupied bandwidth increases or that the information cannot be fully received on the receiver side.

BRIEF SUMMARY OF THE INVENTION

An object of the invention is to provide a content delivery system, a server apparatus, and a receiving apparatus capable of improving in user's entertainment and expanding use of a content delivery service, by enabling a trick play in the same operation/use bandwidth as that at the time of generally receiving streams in a receiving apparatus.

According to the invention, there is provided a content delivery system comprising: a server apparatus which delivers a content to an internet protocol (IP) network according to a request; and a receiving apparatus which is connected to the server apparatus through the IP network, wherein the server apparatus comprises: a memory which stores a management table relating content identification information for specifying the content and a trick play request and a trick play data, the trick play request is different from a reproduction request of the content in the receiving apparatus and that is a request to the content, the trick play data is formed by editing the content in a reproduction format in accordance with a trick play; and a trick play data transmitter which refers to the management table based on the content identification information and the trick play request, when receiving the content identification information, information indicating a reproduction starting position of the content, and a trick play request from the receiving apparatus; and reads out the corresponding trick play data from the management table based on the reference result, to transmit the trick play data to the receiving apparatus from the specified reproduction starting position, and the receiving apparatus comprises: a content reproducer which requests the server apparatus to provide the content and receives and reproduces the content delivered from the server apparatus in reply to the request; a request transmitter which transmits the content identification information, the information indicating the reproduction starting position of the content and the trick play request to the server apparatus through the IP network at a time of a trick play request for the currently reproducing content; and a receiver which receives and reproduces the trick play data transmitted from the server apparatus through the IP network in reply to the trick play request.

According to the invention, there is provided a method used in a system comprising a server apparatus which delivers a content to an internet protocol (IP) network according to a request and a receiving apparatus which is connected to the server apparatus through the IP network, the method comprising: storing a management table relating content identification information for specifying the content and a trick play request and a trick play data in a memory of the server apparatus, the trick play request is different from a reproduction request of the content in the receiving apparatus and that is a request to the content, the trick play data is formed by editing the content in a reproduction format in accordance with a trick play; requesting the server apparatus to provide the content and in reply to the request; receiving and reproducing the content delivered from the server apparatus in the receiving apparatus; transmitting the content identification information, the information indicating the reproduction starting position of the content, and the trick play request from the receiving apparatus to the server apparatus through the IP network at a time of a trick play request for the currently reproducing content; referring to the management table based on the content identification information and the trick play request, in the server apparatus, when receiving the content identification information, the information indicating the reproduction starting position of the content, and the trick play request from the receiving apparatus; reading the corresponding trick play data from the management table based on the reference result; transmitting the data to the receiving apparatus from the specified reproduction starting position; and receiving the trick play data transmitted from the server apparatus through the IP network, in order to reproduce the data in the receiving apparatus.

According to the invention, there is provided a server apparatus which is connected to a receiving apparatus for reproducing a content through an internet protocol (IP) network and delivers the content according to a reproduction request from the receiving apparatus, the server apparatus comprising: a memory which stores a management table relating content identification information for specifying the content and a trick play request and a trick play data, the trick play request is different from a reproduction request of the content in the receiving apparatus and that is a request to the content, the trick play data is formed by editing the content in a reproduction format in accordance with a trick play; and a transmitter which refers to the management table based on the content identification information and the trick play request, when receiving the content identification information, information indicating a reproduction starting position of the content, and a trick play request from the receiving apparatus, reads out the corresponding trick play data from the management table according to the reference result, to transmit the trick play data to the receiving apparatus from the specified reproduction starting position.

According to the invention, there is provided a receiving apparatus which is connected to a server apparatus for delivering a content to an internet protocol (IP) network according to a request, the receiving apparatus comprising: a content reproducer which requests the server apparatus to deliver the content and receives and reproduces the content delivered from the server apparatus in reply to the request; a transmitter which transmits the content identification information, information indicating a reproduction starting position of the content, and a trick play request to the server apparatus through the IP network, when there occurs a trick play request different from a reproduction request for the currently reproducing content; and a receiver which receives and reproduces a trick play data transmitted from the server apparatus through the IP network according to the trick play request, the trick play data is formed by editing the content in a reproduction format according to a trick play.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, embodiments of the invention will be described in detail with reference to the drawings.

(First Embodiment)

Figure 1:
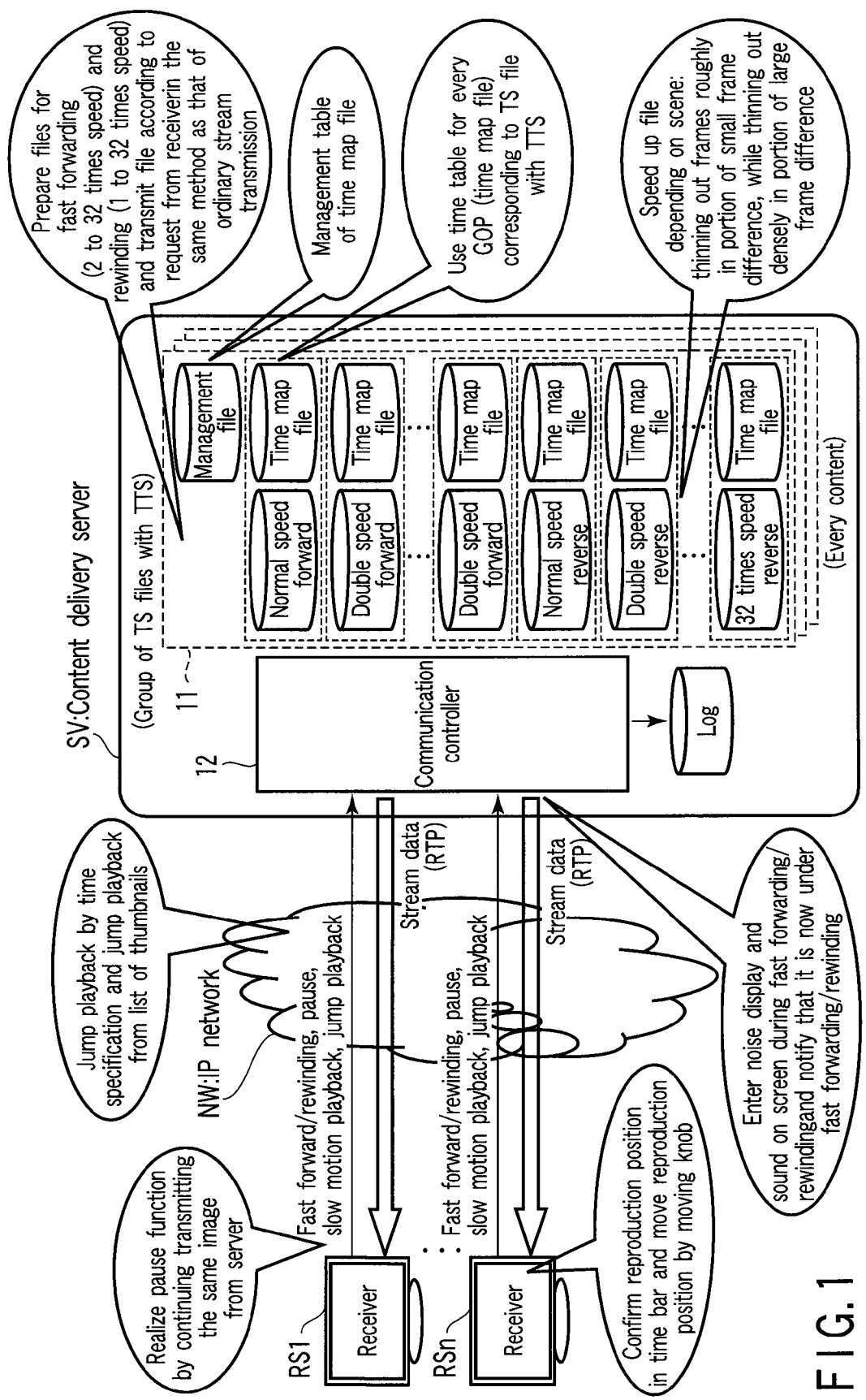
FIG. 1 is a schematic structural view showing a VOD system according to a first embodiment of the invention.

FIG. 1 is a schematic structural view of a VOD system according to a first embodiment of the invention, in which a reference sign SV indicates a content delivery server as a server apparatus and reference signs RS1 to RSn respectively indicate receivers as receiving apparatuses.

The content delivery server SV is connected to the respective receivers RS1 to RSn through an IP network NW, thereby establishing communication between the content delivery server SV and the respective receivers RS1 to RSn.

The content delivery server SV includes a memory 11 and a communication controller 12 having a stream transmission function. The memory 11 stores a management table which relates a content ID for identifying a content and a trick play request such as normal speed forward playback, double speed forward playback, double speed reverse playback, pause, and frame-by-frame advance playback, to trick play data (hereinafter, referred to as a transport stream (TS) file with transmitter time stamp (TTS)) formed by editing the content in the reproduction format corresponding to a trick play. The TS file with TTS is formed by a header portion and a data portion. The header portion stores at least the length and size of stream, the adjustable speed/direction, and the information of video bit rate, and the data portion includes a table formed by the unit of group of picture (GOP) indicating the number information of GOP, starting time, and starting position. The memory 11 stores the data of reproduction time and reproduction position associated with each TS file with TTS.

The communication controller 12 is to communicate with the respective receivers RS1 to RSn through the IP network NW, receive a trick play request from each of the receivers RS1 to RSn, read out the TS file with TTS stored in the memory 11 in reply to the trick play request, convert it into a Real-Time Transport Protocol (RTP) packet, and transmit it.

Figure 2:
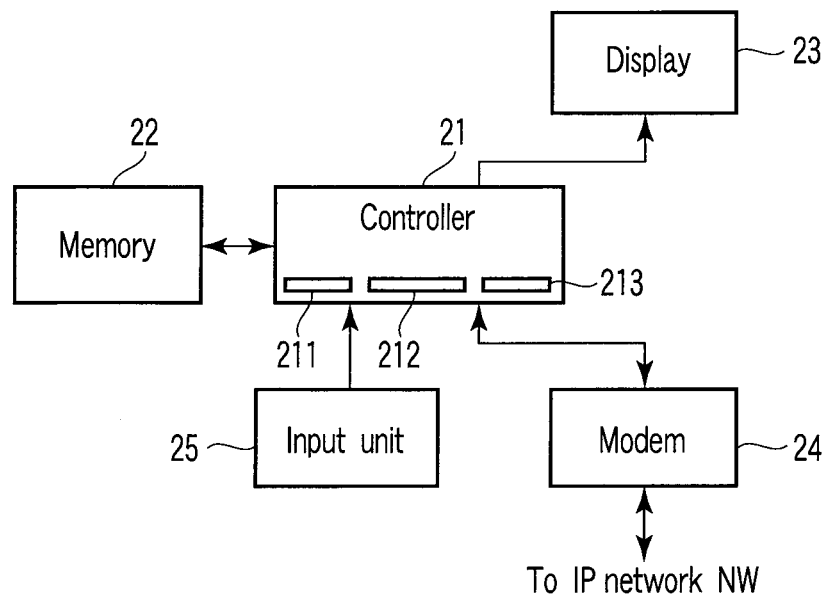
FIG. 2 is a block diagram showing the important components of a receiver shown in FIG. 1.

FIG. 2 is a block diagram showing the important components of each of the receivers RS1 to RSn. Here, the description will be made taking the receiver RS1 as an example.

The receiver RS1 includes a controller 21, a memory 22, a display 23, a modem 24, and an input unit 25 formed by a keyboard, a mouse or a remote controller. Further, the controller 21 has a trick play request transmission function 212 and a reproduction function 213 of the TS file with TTS obtained through the IP network NW, in addition to a content receiving function 211. These functions are realized by the controller 21, the memory 22, the modem 24, and the input unit 25.

The input unit 25 is used to input instructions of various operations to the receiver RS1. Examples of the instructions include a registration instruction of password given at a time of contract with the content delivery server SV and a transmission instruction of the trick play request to the content delivery server SV.

The content receiving function 211 is to request the content delivery server SV to provide a desired content and to receive and reproduce the content delivered from the content delivery server SV according to the request.

The request transmission function 212 is to transmit a trick play request to the content delivery server SV through the modem 24 over the IP network NW when some trick play request is input from the input unit 25. In reply to the trick play request, the TS file with TTS transmitted by the content delivery server SV is received through the modem 24. Hereinafter, the reproduction function 213 demodulates the received TS file with TTS to reproduce the content, supplies a video signal included in this reproduced content to the display 23 to display it, and outputs a sound signal loudly from a speaker not illustrated. In order to reproduce the content having passed through the IP network NW, a codec for exclusive use is set in the controller 21.

Next, a VOD service providing method in the above constituted system will be described.

At first, a viewer (user) who wants to view some content to be provided through the IP network NW makes a contract with a service provider of the content delivery server SV. At that time, the provider registers the user's attribute information including the user's name, address, telephone number of contact address or mail address, and the user ID and password in a client database of the memory 11. Simultaneously, the service provider sends an application tool for setting the password to be assigned to a user and a dedicated codec to the user.

The user sets the application tool sent from the service provider in the receiver RS1. A method of sending the password and application tool includes a method of transmitting them as an attached file of an electronic mail through the IP network NW and a method of mailing them.

Figure 3:
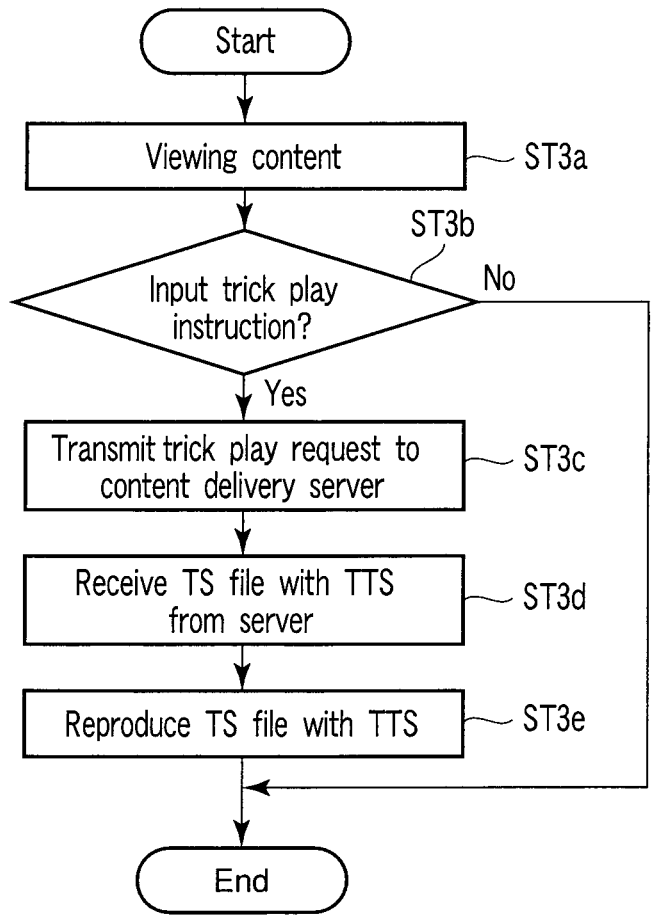
FIG. 3 is a flow chart showing the operation procedure and operation contents of the receiver for carrying out a VOD service providing method according to the first embodiment.
Figure 4:
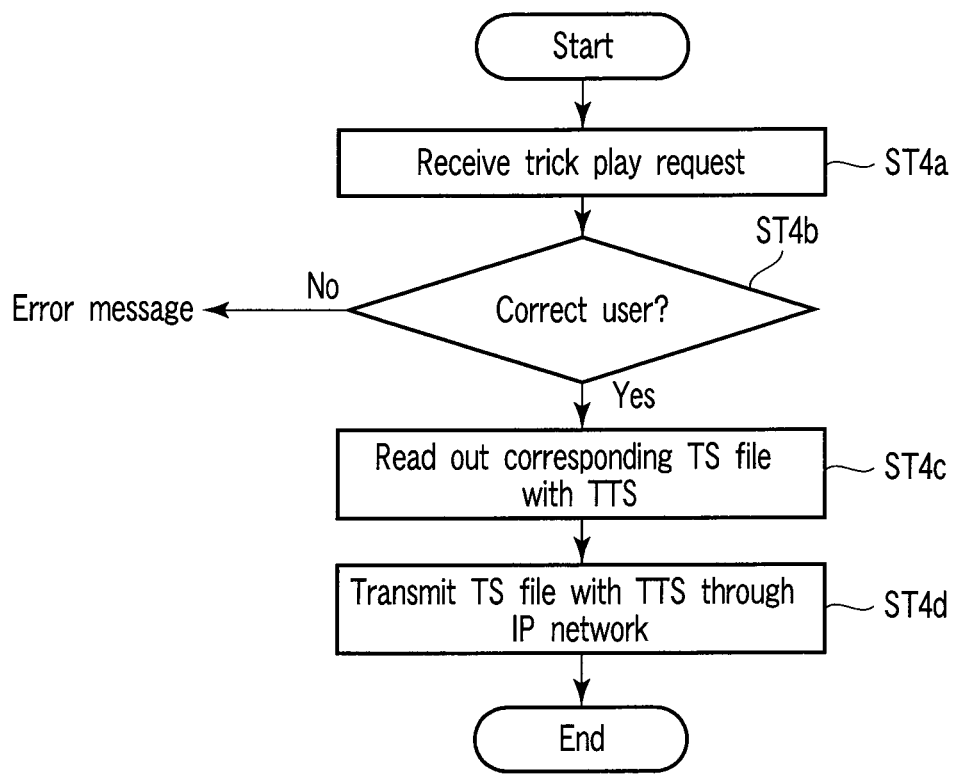
FIG. 4 is a flow chart showing the operation procedure and operation contents of a content delivery server for carrying out the VOD service providing method according to the first embodiment.

FIG. 3 is a flow chart showing the operation procedure and operation contents of the receiver RS1 for carrying out the VOD service providing method, and FIG. 4 is a flow chart showing the operation procedure and operation contents of the content delivery server When a user wants to view a content through the IP network NW, the user gains access to the content delivery server SV through the IP network NW using the receiver RS1, acquires list information from the content delivery server SV and displays it on the display 23, according to a guidance on the screen downloaded from the content delivery server SV.

In this state, when the user selects and specifies a desired program with the input unit 25, the receiver RS1 transmits a request for obtaining a content to the content delivery server SV through the IP network NW. This request includes the content ID which the user wants to obtain, the reproduction position of the content, the user ID, and the password.

Figure 5:
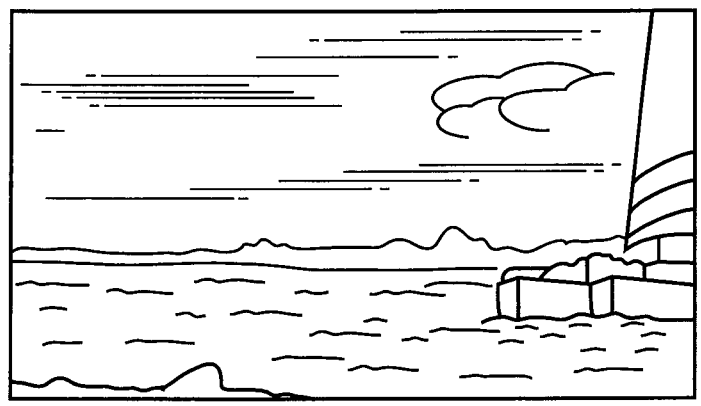
FIG. 5 is a view showing one example of screen display of a content under reproduction according to the first embodiment.

Upon receipt of the RTP packets from the content delivery server SV according to the request, the receiver RS1 reproduces the desired content from the RTP packets (Step ST3a), as shown in FIG. 5. Thus, the user of the receiver RS1 can view his or her favorite content.

During this viewing, when the user selects and specifies "double speed forward playback" using the input unit 25, the receiver RS1 moves from Step ST3b to Step ST3c, where it transmits a trick play request to the content delivery server SV through the IP network NW. This request includes the contents of the desired trick play, that is, the "double speed forward playback", the currently viewing content ID, the user ID, and the password.

When the content delivery server SV receives the trick play request from the receiver RS1 (Step ST4a), it compares the user ID and password included in the trick play request with the user ID and password registered in the client database of the memory 11, to conduct authentication (Step ST4b).

When authentication is not obtained (No), the content delivery server SV transmits an error message to the receiver RS1 of the request source. On the other hand, when authentication is obtained (Yes), the content delivery server SV reads out the TS file with TTS of the corresponding content from the memory 11 (Step ST4c). The content delivery server SV converts the read TS file with TTS into RTP packets and transmits them to the receiver RS1 of the request source through the IP network NW (Step ST4d).

The receiver RS1 receives the RTP packets transmitted from the content delivery server SV through the IP network NW (Step ST3d), converts the RTP packets into the TS file with TTS, and reproduces the TS file with TTS (Step ST3e).

Thus, in the receiver RS1, the "double speed forward playback" is performed. At this time, the receiver RS1 changes thinning-out intervals according to the frame difference. Further, the receiver RS1 also reproduces a known noise video or a sound of winding a tape sent from the content delivery server SV at the same time.

Figure 6:
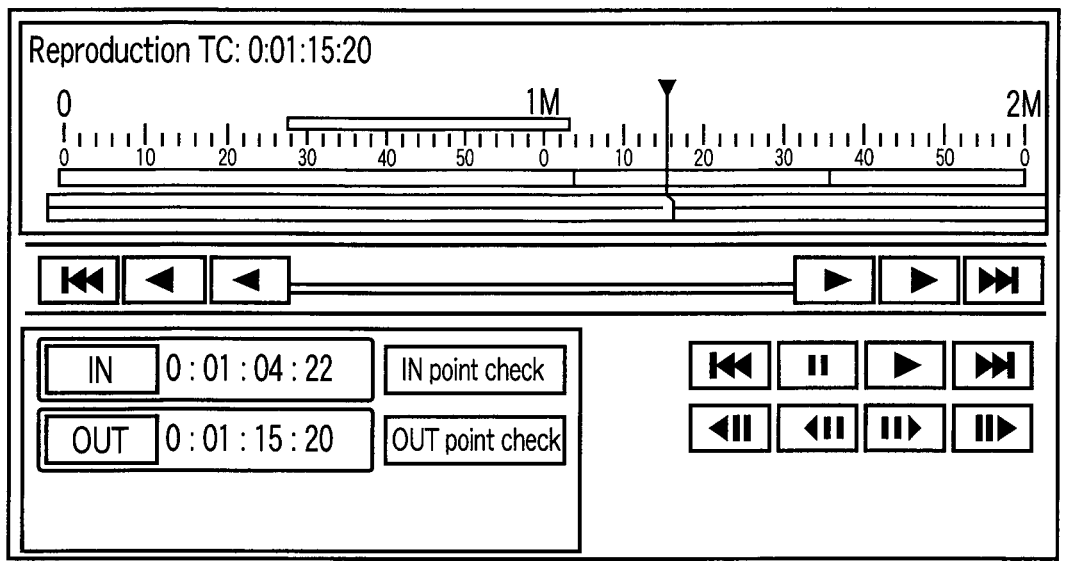
FIG. 6 is a view showing one screen display example of a reproduction bar according to the first embodiment.

During the "double speed forward playback", the receiver RS1 obtains the relative data corresponding to the "double speed forward playback" from the content delivery server SV, according to the user's operation of bar display request, calculates the information of the currently reproducing position according to this reproducing time based on the relative data, and displays the position in a bar on the display screen of the display 23, as illustrated in FIG. 6. According to this, the user of the receiver RS1 can confirm the reproduction position in a bar display and move the reproduction position by moving the cursor for "shift of playback" on the display screen.

Although the above processing has been described taking the "double speed forward playback" as an example, it is the same also in the other trick play.

(Pause)

When a user selects and specifies "pause" with the input unit 25 while viewing a content, the receiver RS1 transmits a trick play request indicating the "pause" to the content delivery server SV through the IP network NW. The content delivery server SV then continues delivering the same video frames. Thus, in the receiver RS1, pause of the currently viewing content is carried out.

(Slow Motion)

When a user selects and specifies "(½) slow motion playback" with the input unit 25 while viewing a content, the receiver RS1 transmits a trick play request indicating the "(½) slow motion playback" to the content delivery server SV through the IP network NW. The content delivery server SV then transmits the same video frame of the delivering stream content twice to the receiver RS1. Thus, in the receiver RS1, the "(½) slow motion playback" of the currently viewing content is carried out.

(Frame-by-Frame Advance)

When a user selects and specifies "frame-by-frame advance playback" with the input unit 25 while viewing a content, the receiver RS1 transmits a trick play request indicating the "frame-by-frame advance playback" to the content delivery server SV through the IP network NW. The content delivery server SV then decodes the specified frame information and continues transmitting the above to the receiver RS1 as one image data. Thus, in the receiver RS1, the "frame-by-frame advance playback" of the currently viewing content is carried out.

(Jump)

When a user selects and specifies "jump playback" with the input unit 25 while viewing a content, the receiver RS1 transmits a trick play request indicating "jump playback" to the content delivery server SV through the IP network NW. The content delivery server SV then creates a plurality of thumbnails by dividing the corresponding content at the predetermined intervals and transmits them to the receiver RS1.

Figure 7:
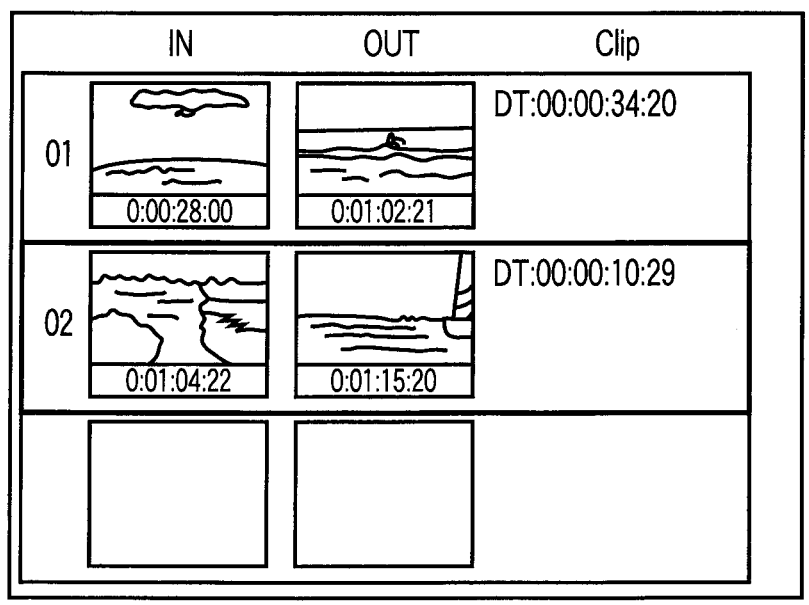
FIG. 7 is a view showing one display example of a list of thumbnails according to the first embodiment.

The receiver RS1 displays a list of the thumbnails sent by the content delivery server SV on the display 23, as illustrated in FIG. 7. When the user inputs an instruction of selecting a thumbnail in the list, the receiver RS1 obtains the corresponding content from the content delivery server SV and reproduces it.

As mentioned above, according to the first embodiment, the content delivery server SV previously edits a content in the respective reproduction formats corresponding to the "double speed forward playback", "double speed reverse playback", "pause", "(½) slow motion playback", "frame-by-frame advance playback", and "jump playback", stores the management table which relates the TS files with TTS for the "double speed forward playback", "double speed reverse playback", "pause", "(½) slow motion playback", "frame-by-frame advance playback", and "jump playback" to the content ID in the memory 11, and when receiving a trick play request from a user of the receivers RS1 to RSn, it transmits the TS file with TTS corresponding to the request to the corresponding receiver of RS1 to RSn.

Accordingly, each of the receivers RS1 to RSn can select various reproduction formats by effectively using the bandwidth over the IP network NW, according to the selection operation of a trick play such as "double speed forward playback", "double speed reverse playback", "pause", "(½) slow motion playback", "frame-by-frame advance playback", and "jump playback". In this way, the delivery speed is changed according to a trick play request on the content delivery server SV side, which reduces a risk of increasing the line occupied bandwidth and causes an increase in the number of service users to the service provider.

According to the first embodiment, since delivery of the same video frames is performed in the content delivery server SV in reply to a request for pause from each of the receivers RS1 to RSn, it is possible to reduce the cost and the processing load in the respective receivers RS1 to RSn.

According to the first embodiment, since the content delivery server SV changes the amount of thinning out according to the frame difference in a fast forwarding/rewinding file to deliver, the fast forwarding/rewinding speed gets slow in the portion where the motion of the video is fast, while the fast forwarding/rewinding speed gets fast in the portion where the motion of the video is slow. It can realize the optimum fast forwarding/rewinding speed according to the motion of the video.

According to the first embodiment, at a time of requesting the "double speed forward playback" or "double speed reverse playback", the known noise video or the sound of winding a tap is transmitted from the content delivery server SV and reproduced by each of the receivers RS1 to RSn. Therefore, a user of each of the receivers RS1 to RSn can confirm whether the fast forwarding/rewinding requested by himself or herself is accepted or not. Since the reproduction processing of the known noise video or the sound of winding a tape is performed by the content delivery server SV, it is possible to reduce the cost and the processing load in each of the receivers RS1 to RSn.

Further, according to the first embodiment, since a plurality of thumbnails are transmitted from the content delivery server SV to each of the receivers RS1 to RSn at a time of requesting the "jump playback", a user of the respective receivers RS1 to RSn can select some thumbnail from a plurality of thumbnails listed on the display screen and view the content immediately from the thumbnail.

(Second Embodiment)

Figure 8:
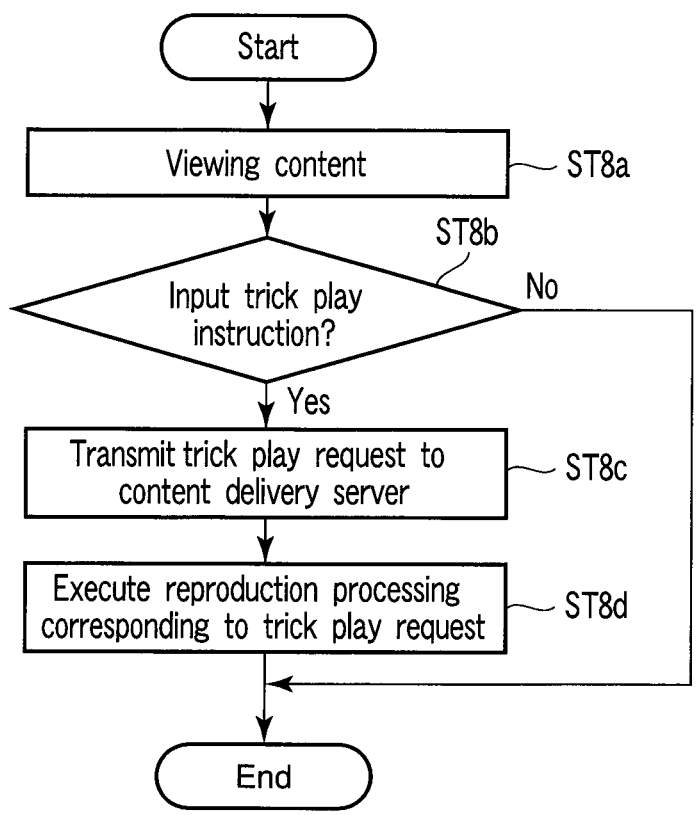
FIG. 8 is a flow chart showing the operation procedure and operation contents of a receiver for carrying out a VOD service providing method according to a second embodiment of the invention.

A second embodiment of the invention is to realize the reproduction formats corresponding to the above "double speed forward playback", "double speed reverse playback", "pause", and "frame-by-frame advance playback" in the respective receivers RS1 to RSn. FIG. 8 is a flow chart showing the operation procedure and operation contents of the receiver RS1 for carrying out the VOD service providing method according to the second embodiment.

(Pause)

When a user selects and specifies "pause" with the input unit 25 while viewing a content (Step ST8a), the receiver RS1 moves from Step ST8b to Step ST8c, where it transmits a trick play request indicating the "pause" to the content delivery server SV through the IP network NW and requests the delivery stop. The receiver RS1 continues keeping the video (Step ST8d) displayed at a time of accepting the pause. Thus, in the receiver RS1, the pause of the currently viewing content is carried out.

(Double Speed Forward)

When a user selects and specifies the "double speed forward playback" with the input unit 25 while viewing a content (Step ST8a), the receiver RS1 moves from Step ST8b to Step ST8c, where it transmits a trick play request indicating the "double speed forward playback" to the content delivery server SV through the IP network NW. The receiver RS1 reproduces the TS file with TTS transmitted from the content delivery server SV and performs such processing that produces a screen display of the known noise video or the sound of winding a tape (Step ST8d). When a user selects and specifies the "double speed reverse playback" with the input unit 25 while viewing a content, the receiver RS1 reproduces the TS file with TTS transmitted from the content delivery server SV and performs the processing that produces the screen display of the known noise video or the sound of winding a tape.

(Frame-by-Frame Advance)

When a user selects and specifies "frame-by-frame advance playback" with the input unit 25 while viewing a content (Step ST8a), the receiver RS1 moves from Step ST8b to Step ST8c, where it transmits a trick play request indicating the "frame-by-frame advance playback" to the content delivery server SV through the IP network NW and requests a delivery stop of the content. The receiver RS1 continues keeping the video signal of the specified frame until receiving the next frame advance request, requests the content delivery server SV to transmit the video signal of the next frame upon receipt of the request of the next frame advance, and requests the content delivery server SV to stop the delivery (Step ST8d) after receiving the video signal of the next frame.

As mentioned above, according to the second embodiment, since the reproduction processing depending on the request such as "double speed forward playback", "double speed reverse playback", "pause", and "frame-by-frame advance playback" is performed in the respective receivers RS1 to RSn, it is possible to reduce the processing load in the content delivery server SV.

(Other Embodiments)

The invention is not restricted to the above embodiments. For example, the content delivery server may reproduce a content in a slow mode by speeding down the transmission speed of the delivery content, at a time of receiving a trick play request of slow motion playback from a receiver.

Alternatively, when transmitting the TS file with TTS for "four times speed forward playback" and "four times speed reverse playback" to a receiver, the content delivery server may thin out frames at the wider intervals than that of the "double speed forward playback" and "double speed reverse playback" and transmit the predetermined video repeatedly within this thinning out intervals a plurality of times.

As for the structure of the VOD system, the functional structure of the content delivery server, the type of the receiver and its structure (for example, personal computer having a television tuner and a portable television), the providing procedure of the VOD service, and the type of trick play, various modifications can be made without departing from the spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A content delivery system comprising:
a server apparatus configured to deliver a content to an internet protocol (IP) network according to a reproduction request; and
a receiving apparatus configured to be connected to the server apparatus through the IP network, wherein the receiving apparatus transmits the reproduction request to the server apparatus, and receives and reproduces the content delivered from the server apparatus according to the reproduction request,
wherein the server apparatus comprises:
a memory configured to store trick play data and a management table relating to content identification information for specifying the content and the trick play request, wherein the trick play request is different from the reproduction request, and the trick play data is formed by editing the content in accordance with trick play; and
a trick play data transmitter configured to refer to the management table based on the content identification information and the trick play request, when receiving the content identification information, information indicating a reproduction starting position of the content, and a trick play request from the receiving apparatus; and reads out the corresponding trick play data from the memory based on a reference result of the management table, to transmit the trick play data to the receiving apparatus from the specified reproduction starting position, and
the receiving apparatus comprises:
a content reproducer configured to request the server apparatus to provide the content and receives and reproduces the content delivered from the server apparatus in reply to the request;
a request transmitter configured to transmit the content identification information, the information indicating the reproduction starting position of the content and the trick play request to the server apparatus through the IP network at a time of a trick play request for the currently reproducing content; and
a receiver configured to receive and produce the trick play data transmitted from the server apparatus through the IP network in reply to the trick play request,
wherein the transmitter changes thinning out intervals according to a motion of a video indicated by a frame difference in a fast forwarding/rewinding file when transmitting the fast forwarding/rewinding file to the receiving apparatus as the trick play data, wherein the thinning out interval is inversely proportional to a speed of the motion, wherein a fast forwarding/rewinding speed gets slow in the portion where the motion of the video is fast, while the fast forwarding/rewinding speed gets fast in the portion where the motion of the video is slow.

2. A method used in a system comprising a server apparatus configured to deliver a content to an internet protocol (IP) network according to a reproduction request and a receiving apparatus configured to be connected to the server apparatus through the IP network, wherein the receiving apparatus transmits the reproduction request, and receives and reproduces the content delivered from the server apparatus according to the reproduction request, the method comprising:

storing trick play data and a management table relating to content identification information for specifying the content and trick play request in a memory of the server apparatus, wherein the trick play request is different from the reproduction request, and wherein the trick play data is formed by editing the content in accordance with a trick play;
requesting the server apparatus to provide the content and in reply to the request;
receiving and reproducing the content delivered from the server apparatus in the receiving apparatus;
transmitting the content identification information, the information indicating the reproduction starting position of the content, and the trick play request from the receiving apparatus to the server apparatus through the IP network at a time of a trick play request for the currently reproducing content;
referring to the management table based on the content identification information and the trick play request, in the server apparatus, when receiving the content identification information, the information indicating the reproduction starting position of the content, and the trick play request from the receiving apparatus;
reading the corresponding trick play data from the memory based on a reference result of the management table;
transmitting the data to the receiving apparatus from the specified reproduction starting position; and
receiving the trick play data transmitted from the server apparatus through the IP network, in order to reproduce the data in the receiving apparatus,
wherein the transmitting the data to the receiving apparatus includes changing thinning out intervals according to a motion of a video indicated by a frame difference in a fast forwarding/rewinding file when transmitting the fast forwarding/rewinding file to the receiving apparatus as the trick play data, wherein the thinning out interval is inversely proportional to a speed of the motion, wherein a fast forwarding/rewinding speed gets slow in the portion where the motion of the video is fast, while the fast forwarding/rewinding speed gets fast in the portion where the motion of the video is slow.

3. A server apparatus configured to be connected to a receiving apparatus for reproducing a content through an internet protocol (IP) network and deliver the content according to a reproduction request from the receiving apparatus, the server apparatus comprising:
a memory configured to store trick play data and a management table relating to content identification information for specifying the content and a trick play request and the trick play data, wherein the trick play request is different from the reproduction request, and the trick play data is formed by editing the content in accordance with a trick play; and
a transmitter configured to refer to the management table based on the content identification information and the trick play request, when receiving the content identification information, information indicating a reproduction starting position of the content, and a trick play request from the receiving apparatus, reads out the corresponding trick play data from the memory according to a reference result of the management table, to transmit the trick play data to the receiving apparatus from the specified reproduction starting position,
wherein the transmitter changes thinning out intervals according to a motion of a video indicated by a frame difference in a fast forwarding/rewinding file when transmitting the fast forwarding/rewinding file to the receiving apparatus as the trick play data, wherein the thinning out interval is inversely proportional to a speed of the motion, wherein a fast forwarding/rewinding speed gets slow in the portion where the motion of the video is fast, while the fast forwarding/rewinding speed gets fast in the portion where the motion of the video is slow.

4. The server apparatus according to claim 3, wherein the trick play data is composed of a header portion and a data portion, the header portion stores at least information about length and size of stream, variable speed/direction, and video bit rate, and the data portion includes a table indicating number information of group of picture (GOP), starting time, and starting position for every GOP.

5. The server apparatus according to claim 3, wherein the transmitter performs pause by keeping delivering the same video frame when receiving a pause request from the receiving apparatus as the trick play request.

6. The server apparatus according to claim 3, wherein the transmitter performs slow motion playback by speeding down transmission speed of the content, when receiving a slow motion request as the trick play request.

7. The server apparatus according to claim 3, wherein the transmitter performs slow motion playback by transmitting the same video frame of the content to the receiving apparatus by the number of times m, when receiving a request for 1/m (m is natural number) slow motion playback as the trick play request.

8. The server apparatus according to claim 3, wherein the transmitter decodes a specified video frame and keeps transmitting the frame to the receiving apparatus as one image data, when receiving a frame-by-frame advance request from the receiving apparatus.

9. The server apparatus according to claim 3, wherein in the case of transmitting a fast forwarding/rewinding file to the receiving apparatus as the trick play data, the transmitter transmits the data after thinning out the frames at first intervals previously determined when the corresponding content is a first reproduction file, while the transmitter transmits the data after thinning out the frames at second intervals wider than the first intervals when the content is a second reproduction file having a faster reproduction speed than the first reproduction file, and repeatedly transmits the predetermined video a plurality of times within the second intervals.

10. The server apparatus according to claim 3, wherein the transmitter transmits video of known noise or sound of winding a tape simultaneously when transmitting a fast forwarding/rewinding file to the receiving apparatus as the trick play data.

11. The server apparatus according to claim 10, wherein the transmitter combines the noise video or sound with the fast forwarding/rewinding file and transmits the above to the receiving apparatus.

12. The server apparatus according to claim 3, wherein the memory stores data relating to reproduction time to reproduction position for every trick play data, and
the transmitter transmits the related data according to a request from the receiving apparatus when transmitting the fast forwarding/rewinding file.

13. The server apparatus according to claim 3, wherein the transmitter creates a plurality of thumbnails by dividing the corresponding content at specified intervals and transmits them to the receiving apparatus, when receiving a request for jump playback from the receiving apparatus.

14. A receiving apparatus configured to be connected to a server apparatus for delivering a content to an internet protocol (IP) network according to a reproduction request, the receiving apparatus comprising:

a content reproducer configured to request the server apparatus to deliver the content and receive and reproduce the content delivered from the server apparatus in reply to the reproduction request;
a transmitter configured to transmit the content identification information, information indicating a reproduction starting position of the content, and a trick play request to the server apparatus through the IP network, when there occurs a trick play request different from the reproduction request for the currently reproducing content; and
a receiver configured to receive and reproduce trick play data transmitted from the server apparatus through the IP network according to the trick play request, the trick play data is formed by editing the content according to a trick play,
wherein the transmitter changes thinning out intervals according to a motion of a video indicated by a frame difference in a fast forwarding/rewinding file when transmitting the fast forwarding/rewinding file to the receiver as the trick play data, wherein the thinning out interval is inversely proportional to a speed of the motion, wherein a fast forwarding/rewinding speed gets slow in the portion where the motion of the video is fast, while the fast forwarding/rewinding speed gets fast in the portion where the motion of the video is slow.

15. The receiving apparatus according to claim 14, wherein the transmitter requests the server apparatus to stop the delivery at a time of a pause request, and
the receiver performs the pause by keeping the video displayed at the time of receiving the pause.

16. The receiving apparatus according to claim 14, wherein at a time of a frame-by-frame advance request as the trick play request, the transmitter requests the server apparatus to stop the delivery, continues keeping a video signal of the specified frame until generating a next frame-by-frame advance request, requests the server apparatus to transmit a video signal of a next frame when there occurs the next frame-by-frame advance request, and requests the server apparatus to stop the delivery after the video signal of the next frame is delivered.

17. The receiving apparatus according to claim 14, wherein the receiver displays a known noise video on a screen or issues a sound of winding a tape when receiving a fast forwarding/rewinding file as the trick play data.

18. The receiving apparatus according to claim 14, comprising:
when the server apparatus stores data relating to reproduction time to reproduction position for every trick play data,
a unit to obtain reproduction starting position information included in the related data from the server apparatus, wherein the unit calculates the current reproduction position information according to the own reproduction time, and displays the information in a bar on a display screen, when receiving a fast forwarding/rewinding file.

19. The receiving apparatus according to claim 14, wherein the transmitter transmits a jump playback request to the server apparatus as the trick play request, and
the receiver further comprises:
a unit to display a list of a plurality of thumbnails sent from the server apparatus on a display, in reply to the jump playback request; and
a unit to obtain the corresponding content from the server apparatus to reproduce the content when a user inputs an instruction of selecting a thumbnail on the list display.

* * * * *